3,246,018
3β-AMINOANDROST-5-ENE-17β-CARBOXYLIC
ACID AND DERIVATIVES THEREOF
Leslie A. Freiberg, Waukegan, and John Wayne Cole, Deerfield, Ill., assignors to Abbott Laboratories, North Chicago, Ill., a corporation of Illinois
No Drawing. Filed June 10, 1964, Ser. No. 374,160
11 Claims. (Cl. 260—397.1)

The present invention relates to new steroids; more particularly, it relates to 3β-aminoandrost-5-ene-17β-carboxylic acid and the corresponding alkyl esters and N-substituted derivatives.

The new steroids are represented by the general formula

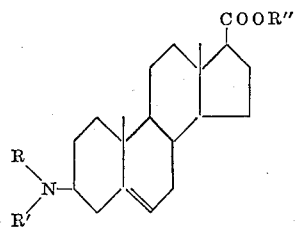

wherein R is hydrogen, loweralkyl or a fatty acid acyl group and wherein R' and R'' are hydrogen or loweralkyl. The new compounds are useful growth-regulating agents; particularly, they influence the growth of the thyroid gland in warm-blooded animals. The new steroids also possess anti-androgenic activity of the type described by Dorfman in Acta Endocrinologica, volume 33, page 308 (1960). Furthermore, they may be used as intermediates in the synthesis of alkaloids of the holarrhena series which have useful properties as described in Therapie, volume 15, page 1212 (1960), as local anesthetics and muscle relaxants. For such synthesis, the present amino acids are treated in the form of their amido esters with methyl Grignard reagent to form the intermediate 20-tertiary alcohol, which is then transformed into the 20-ketone by the method described by Koechlin and Reichstein in Helv. Chim. Acta, volume 27, page 549 (1944).

The new compounds are made by reacting a 6-alkoxy-17β-carbalkoxy - 3α,5α - cycloandrostane with hydrazoic acid in an inert, anhydrous, non-polar, organic solvent such as benzene, toluene, xylene, tetrahydrofurane, pentane, and the like, in the presence of an acid catalyst such as boron trifluoride, toluene sulfonic acid, and the like. When boron trifluoride is used, it may be bubbled into the reaction mixture or it may be added in the form of, a solid complex such as the etherate.

The formed compound, 3β - azidoandrost - 5-ene-17β-carboxylic acid ester is separated from the reaction mixture and converted to the 3β-amino derivative by reduction. The reaction for making the 3β-azido compound can be carried out at room temperature with satisfactory results, although temperature as high as 40° C. may be used where faster conversion is desired. The reaction of the hydrazoic acid with the 6,17-disubstituted cycloandrostane is preferably allowed to proceed for at least 1 hour. The reduction of the 3-azido ester to the corresponding 3-amino compound can be done in various ways known in the art, e.g., by treating the azido compound with zinc and acetic acid, by hydrogenating the azido compound using a mild catalyst or even by electrolytic reduction.

The obtained 3β-amino compounds can be converted into the analogous acylamino or alkylamino derivatives through methods well accepted in the art, e.g., a 3β-acylamino compound is obtained by treating the amino compound with an acyl chloride or a fatty acid anhydride; the alkylated derivatives can be made, e.g., by first making a Schiff base with an aliphatic aldehyde and subsequently partially hydrogenating the latter, using Raney nickel catalyst. The 3β-alkylamino compound so obtained may be converted into its N-alkyl-N-acyl derivative by treatment with an acyl chloride or a fatty acid anhydride.

It will be apparent to those skilled in the art that the above esters can easily be saponified to the corresponding 17β-carboxy derivatives and the carboxy derivatives can be esterified, in turn, with any desired loweralkyl alcohol to the corresponding alkyl esters.

To illustrate the preparation of the new compounds of the present invention, reference is made to the following examples which are not intended to limit the invention in any respect. In these examples, wherever reference is made to a mixture of solvents and no ratio of such solvents is given, it is to be understood that the first named solvent is used to dissolve the material to make a concentrated solution, and the second solvent is then added to induce or complete crystallization.

*Example 1.—6β-methoxy-17β-carbomethoxy-3α,5α-cycloandrostane*

A mixture of 11.0 grams of 3β-p-toluenesulfonoxy-17β-carboxymethoxy-androst-5-ene, 22 grams of anhydrous sodium acetate, and 1.0 liter of anhydrous methanol is refluxed with stirring for 6 hours. About two-thirds of the methanol is then distilled and 1.0 liter of water is added. The product is extracted with ether and the ether washed in turn with 10% sodium hydroxide and water. The ether extract is dried with anhydrous magnesium sulfate and evaporated, giving 7.31 grams of crude 6β - methoxy-17β-carbomethoxy-3α,5α-cycloandrostane. Purification is accomplished by absorption onto 250 grams of magnesium silicate, activated as described in U.S. 2,393,625 (marketed under the trade name of Florisil). Elution is begun with benzene and followed by benzene/ether. The major consecutive fractions are combined and evaporated, leaving 5.82 grams of 6β-methoxy-17β-carbomethoxy-3α,5α - cycloandrostane with a melting point of 70–74° C. A small sample crystallized from methanol/water shows a melting point of 72.5–73.5° C. The analytical values for this sample show excellent agreement with the values calculated for the compound of the empirical formula $C_{22}H_{34}O_3$.

*Example 2.—3β-azido-17β-carbomethoxyandrost-5-ene*

To 3.1 grams of 6β-methoxy-17β-carbomethoxy-3α,5α-cycloandrostane is added 65 ml. of benzene containing 4.0 grams of hydrazoic acid, and 2.0 ml. of freshly distilled boron trifluoride etherate. The mixture is allowed to stand at 25° for 3.5 hours. To the reaction mixture, 100 ml. of 6 N ammonium hydroxide is added, followed by the addition of 200 ml. of ethyl ether. The organic phase is washed in turn with 6 N ammonium hydroxide and water. The organic layer is dried with magnesium sulfate and then evaporated, giving 3.18 grams of 3β-azido-17β-carbomethoxyandrost-5-ene melting at 99–105° C. A small sample crystallized from methanol/water has a melting point of 106–108° C. The analytical values obtained are in close agreement with those calculated for the compound of empirical formula $C_{21}H_{31}N_3O_2$.

*Example 3.—3β-amino-17β-carbomethoxyandrost-5-ene and N-alkyl derivatives*

(a) To a rapidly stirred solution of 6.95 grams of 3β-azido-17β-carbomethoxyandrost-5-ene in 490 ml. of glacial acetic acid/ethyl ether (1:1) is added 37 grams of acid-washed electrolytic zinc sponge. The mixture is stirred overnight at 25° C. and the zinc is then removed by filtration. The acetic acid used for rinsing the zinc is combined with the filtrate. The ether in the filtrate is removed by evaporation and most of the acetic acid is distilled in vacuo. To the residue is added a mixture of 100 ml. of water and 100 ml. of ethyl ether. The mixture is made basic with 30% aqueous potassium hydroxide and the aqueous phase is separated and extracted with ethyl ether. The combined ether extracts are washed in turn with 10% potassium hydroxide and water. The ether is dried with anhydrous magnesium sulfate and evaporated, giving 5.10 grams of crude 3β-amino-17β-carbomethoxyandrost-5-ene. Purification is accomplished by absorption of a solution of this crude material in 20 ml. of benzene on a column containing 250 grams of Florisil and eluting the column with benzene/piperidine (1000:3) followed by gradient elution with benzene/ethyl ether/piperidine (1000:20:3). The major consecutive fractions are combined, treated with charcoal, and evaporated, to give 2.28 grams of 3β-amino-17β-carbomethoxyandrost-5-ene melting at 145–151° C. A small sample is crystallized from methanol/water, giving a pure product melting at 150.5–151.5 ° C. and having an analysis in close agreement with the values calculated for the formula $C_{21}H_{33}NO_2$.

(b) A solution of 50 mg. of 3β-amino-17β-carbomethoxyandrost-5-ene, 20 ml. of ethanol, and 15 mg. of acetaldehyde is hydrogenated in a Parr shaker after adding 9 mg. of Raney nickel at room temperature and atmospheric pressure. After absorption of one molar equivalent of hydrogen, the mixture is filtered and evaporated. From the residue, 3β-ethylamino - 17β - carbomethoxyandrost-5-ene is obtained, of which an analytical sample shows good agreement with the values calculated for the compound of formula $C_{23}H_{37}NO_2$. Alternatively the Schiff base resulting from the above reaction with acetaldehyde may be reduced directly with sodium borohydride in methanol solution at room temperature.

(c) A solution of 200 mg. of 3β-amino-17β-carbomethoxyandrost-5-ene in 25 ml. of methanol containing 0.1 ml. of concentrated hydrochloric acid is stirred with excess formaldehyde and zinc dust according to the process of Wagner as described in Organic Reactions, 4, page 198 (1948, John Wiley & Sons). The crude dimethylamino ester solution is evaporated, cooled, and then shaken with ether and cold dilute sodium hydroxide to separate an ether solution of the product. The ether solution is washed with sodium hydroxide solution, followed by water, and then concentrated to give the 3β-dimethylamino-17β-carbomethoxyandrost-5-ene of the formula $$C_{23}H_{37}NO_2$$

*Example 4.—3β-amino-17β-carboxyandrost-5-ene*

To a solution of 1.56 grams of 3β-amino-17β-carbomethoxyandrost-5-ene in 40 ml. of methanol is added 10 ml. of water containing 0.9 gram of potassium hydroxide. After refluxing the mixture overnight, it is cooled, filtered, and the methanol is removed in vacuum. A small amount of methanol is then added again to redissolve the precipitate and the solution is neutralized with 1.0 N hydrochloric acid. The crystals of 3β-amino-17β-carboxyandrost-5-ene are collected and dried at 60° C. and 1.0 mm. pressure; they represent 1.31 grams of crude 3β-amino-17β-carboxyandrost-5-ene. Purification of these crystals is effected by sublimation at 250–260° C./0.1 mm. pressure, giving crystals with a melting point of 443–446° C. (decomposition) in a sealed evacuated capillary. The analytical values obtained are in close agreement with those calculated for the formula 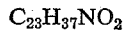 $C_{20}H_{31}NO_2$.

*Example 5.—3β-acetamido-17β-carbomethoxyandrost-5-ene*

To a solution of 677 mg. of 3β-amino-17β-carbomethoxyandrost-5-ene in 30 ml. of pyridine is added 16 ml. of acetic anhydride and the mixture is allowed to stand at room temperature overnight. The reaction mixture is then poured onto ice and the product is extracted with ether. The ether extracts are washed with 3 N hydrochloric acid, 10% sodium hydroxide, and finally with water. The ether is dried with anhydrous magnesium sulfate and is evaporated, giving 709 mg. of crude 3β-acetamido - 17β - carbomethoxyandrost-5-ene. Recrystallization from methanol/water and subsequently from benzene/hexane gives 341 mg. of the pure product melting at 234–236° C. in a sealed evacuated capillary. Analytical values obtained are in close agreement with those calculated for the compound of empirical formula $C_{23}H_{35}NO_3$.

By replacing the above acetic anhydride with propionic anhydride, the corresponding 3β-propionamide is obtained in a similar yield.

When 3β-ethylamino-17β-carbomethoxyandrost-5-ene is used in the above procedure in place of the 3β-amino compound, the product obtained is 3β-N-ethyl-N-acetylamino-17β-carbomethoxyandrost-5-ene, having the formula $C_{25}H_{39}NO_3$.

*Example 6.—3β-acetamido-17β-carboxyandrost-5-ene*

To a solution of 350 mg. of 3β-amino-17β-carboxyandrost-5-ene in 12 ml. of pyridine is added 10 ml. of acetic anhydride and the mixture is allowed to stand overnight at room temperature. The reaction mixture is then poured onto cracked ice and the product is dissolved in chloroform and washed in turn with 3 N hydrochloric acid and water. The chloroform solution is dried with anhydrous magnesium sulfate and evaporated to give crude 3β-acetamido-17β-carboxyandrost-5-ene which is recrystallized from methanol to give 251 mg. of 3β-acetamido-17β-carboxyandrost-5-ene melting at 282–285° C. in a sealed evacuated capillary. The analytical values are in close agreement with those calculated for the formula $$C_{22}H_{33}NO_3 \cdot HOCH_3$$

It will be apparent to those skilled in the art that other derivatives falling within the above-defined class of new compounds can be made in analogous processes. For instance, all the 3β-loweralkylamino-17β-carboxyandrost-5-enes and their alkyl esters can be made from the corresponding 3β-amino compound by following the procedure outlined above and that described in Organic Reactions, volume IV, page 196 ff. (John Wiley & Company, 1948). Similarly, other 3β-acylamino derivatives can be made by using longer fatty acid anhydrides or halides in the reaction with the 3β-amino compounds defined above.

The 3β-azido compounds are best prepared by treating the 6β-alkoxy-17β-carbomethoxy-3α,5α - cycloandrostanes  with boron trifluoride and hydrazoic acid. The boron can be used as a gas or as a complex such as the trifluoride etherate. Other acid catalysts may be used similarly.

Others may practice the invention in any of the numerous ways which will be suggested to those skilled in the art by the present disclosure. All such practice of the invention is considered a part hereof, provided it falls within the scope of the appended claims.

We claim:

1. The process of making 3β-amino-17β-carbalkoxyandrost-5-enes consisting essentially in exposing a 6-alkoxy-17β-carbalkoxy-3α,5α-cycloandrostane to hydrazoic acid in the presence of a non-polar, inert, anhydrous, organic solvent and an acid catalyst, separating the formed 3β-azido-17β-carbalkoxyandrost-5-ene, and reducing the 3β-azido group in the latter to the 3β-amino group.

2. The process of claim 1 wherein said acid catalyst is boron trifluoride.

3. The process of claim 2 wherein said boron trifluoride is added in the form of the etherate complex.

4. The process of claim 1 wherein said organic solvent is benzene.

5. The process of claim 1 wherein said 17β-carbalkoxy group is the carbomethoxy group.

6. A steroid of the formula

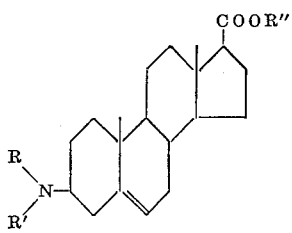

wherein R is selected from the group consisting of hydrogen, A and ACO, and wherein R′ and R″ are selected from the group consisting of hydrogen and A, A being lower alkyl.

7. 3β-amino-17β-carbomethoxyandrost-5-ene.
8. 3β-amino-17β-carboxyandrost-5-ene.
9. 3β-ethylamino-17β-carbomethoxyandrost-5-ene.
10. 3β-acetamido-17β-carbomethoxyandrost-5-ene.
11. 3β-acetamido-17β-carboxyandrost-5-ene.

No references cited.

LEWIS GOTTS, Primary Examiner.

HENRY A. FRENCH, Assistant Examiner.